(12) United States Patent
Sandford (10) Patent No.: US 6,505,416 B2
(45) Date of Patent: *Jan. 14, 2003

(54) CENTRIFUGAL PELLET DRYER APPARATUS

(75) Inventor: Lyell Sandford, Wexford, PA (US)

(73) Assignee: The Conair Group, Inc., Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/957,559

(22) Filed: Sep. 20, 2001

(65) Prior Publication Data

US 2002/0062576 A1 May 30, 2002

Related U.S. Application Data

(62) Division of application No. 09/685,282, filed on Oct. 10, 2000.

(51) Int. Cl.⁷ .................................................. F26B 17/12
(52) U.S. Cl. ........................................................ 34/168
(58) Field of Search ............................ 34/168, 59, 173, 34/182, 183

(56) References Cited

U.S. PATENT DOCUMENTS

| | | |
|---|---|---|
| 3,458,045 A | 7/1969 | Dudley |
| 3,675,697 A | 7/1972 | Muller |
| 4,123,207 A | 10/1978 | Dudley |
| 4,218,323 A | 8/1980 | McCracken |
| 4,251,198 A | 2/1981 | Altenberg |
| 4,476,019 A | 10/1984 | Norwisch et al. |
| 4,500,271 A | 2/1985 | Smith |
| 4,565,015 A | 1/1986 | Hundley, III |
| 4,570,359 A | 2/1986 | Rudolph |
| 4,621,996 A | 11/1986 | Hundley, III |
| 4,728,276 A | 3/1988 | Pauley et al. |
| 4,888,990 A | 12/1989 | Bryan et al. |
| 4,896,435 A | 1/1990 | Spangler, Jr. |
| 5,059,103 A | 10/1991 | Bruckmann et al. |
| 5,187,880 A | 2/1993 | Rudolph |
| 5,265,347 A | 11/1993 | Woodson et al. |
| 5,403,176 A | 4/1995 | Bruckmann et al. |

(List continued on next page.)

FOREIGN PATENT DOCUMENTS

| | | |
|---|---|---|
| CH | 620 859 | 12/1980 |
| DE | 199 00 042 | 7/2000 |
| WO | WO 00/23758 | 4/2000 |

OTHER PUBLICATIONS

US 5,962,033, 10/1999, Spelleken (withdrawn)

Primary Examiner—Teresa Walberg
Assistant Examiner—Vinod D. Patel
(74) Attorney, Agent, or Firm—Buchanan Ingersoll, P.C.

(57) ABSTRACT

A centrifugal pellet dryer apparatus, lifter and rotor wherein the lifters can have a surface configured to deflect pellets inwardly and the rotor can have lifters attached in an arrangement designed to increase pellet impacts with lifters by providing a higher concentration of lifters on the rotor in a first region which initially engages a slurry of pellets and water. The inwardly curved lifters tend to direct the pellets inwards toward other lifters and away from dewatering screens and the higher concentration of lifters on the lower region of the rotor results in added pellet impacts with lifters. The centrifugal pellet dryer can have an outer housing, a base portion with a water discharge outlet and a top portion having a pellet discharge port and an exhaust port. Within the housing can be one or more generally cylindrical foraminous members disposed around the rotor. One or more separator plates can be provided between the foraminous members to divide the pellet dryer into sections. The rotor with lifters affixed rotates within the foraminous members to direct pellets upwardly to the pellet discharge port which can have a counter-flow air inlet.

10 Claims, 9 Drawing Sheets

U.S. PATENT DOCUMENTS

| | | |
|---|---|---|
| 5,611,150 A | 3/1997 | Yore, Jr. |
| 5,624,688 A | 4/1997 | Adams et al. |
| 5,634,601 A | 6/1997 | Hild et al. |
| 5,638,606 A | 6/1997 | Bryan et al. |
| 5,638,741 A | 6/1997 | Cisaria |
| 5,685,487 A | 11/1997 | Ellis |
| 5,725,365 A | 3/1998 | Solomon et al. |
| 5,885,006 A | 3/1999 | Sheedy |
| 5,888,554 A | 3/1999 | Zollitsch et al. |
| 5,987,769 A | 11/1999 | Ackerman et al. |
| 6,016,921 A | 1/2000 | Hauch |
| 6,138,375 A | 10/2000 | Humphries, II et al. |
| 6,237,244 B1 | 5/2001 | Bryan et al. |

CENTRIFUGAL PELLET DRYER APPARATUS

RELATED APPLICATIONS

This application is a Divisional Application of co-pending U.S. patent application Ser. No. 09/685,282, filed Oct. 10, 2000.

BACKGROUND

The invention relates generally to centrifugal pellet dryers utilized to dry plastic pellets which have been cut from strands of plastic by a pelletizer, and more particularly, to a centrifugal pellet dryer apparatus including improved rotor and lifters which can provide enhanced dewatering capabilities. The invention also relates to additional improvements in the centrifugal pellet dryer apparatus which can further enhance dewatering capabilities.

Generally, a water slurry of plastic pellets is introduced into a pellet dryer for separation of the pellets from the water. The dry pellets can then be conveyed to a shipping container or to a location for further processing. Centrifugal pellet dryers are well known in the art. In particular, U.S. Pat. No. 5,611,150, to Yore, Jr., issued Mar. 18, 1997, which is hereby incorporated herein by reference, discloses a "Centrifugal Pellet Dryer" wherein a slurry of pellets and water is introduced upwardly through the bottom of the dryer, into a hollow a region in the rotor and out through ports in the rotor. In this manner, the slurry is directed radially outwards from generally the center of the rotor. The rotor has lifters, i.e. blades, which carry the pellets and water upwardly through the dryer as the water is forced outwardly by centrifugal force through a cylindrical screen that surrounds the rotor. The dewatered pellets are discharged through an exit port near the top of the cylindrical screen while the separated water is drained through the bottom of the dryer housing. Prior to the centrifugal pellet dryer described in the '150 patent, centrifugal pellet dryers introduced the slurry of pellets and water through an entry port in the side of the pellet dryer. The slurry was injected inwardly towards the rotor and the lifter affixed to the outside of the rotor drove the slurry outwards against the screen as the rotor was rotated. In that configuration, the rotor breaks the stream of the slurry where it is introduced through the side of the pellet dryer, causing a large portion of the pellets to be deposited on the portion of the screen nearest the slurry entry port. In contrast, the pellet dryer disclosed in the '150 patent describes introducing the slurry of pellets and water through the center of the rotor and radially outward into the space between the rotor and the mesh member. By introducing the pellets and water through the center of the rotor, the slurry of pellets and water is radially, and more evenly, distributed by the rotor lifters about the interior of the pellet dryer. Thus, pellet impacts are not concentrated at any single area of the screen, in contrast to the conventional pellet dryers which injected slurry through a side port where most of the initial dewatering is done in the first quadrant adjacent to the slurry inlet, which loads up the screen and limits its effectiveness in the initial dewatering stage.

Introducing the slurry through the rotor also minimizes radial bearing loads that are present in the prior-pellet dryers since the lifter blades in those pellet dryers must break the stream of water and pellets in a single location which is off-center from the axis of the rotor. The feed of the slurry through center of the rotor also enhances the centrifugal force of the rotor to throw the water radially through the screen to thereby enhance the initial dewatering stage of the dryer.

Recently issued U.S. Pat. No. 5,987,769, to Ackerman, et al., issued Nov. 23, 1999, discloses an alternative manner of introducing a slurry of pellets and water generally into the center of the pellet dryer. However, the slurry is not injected radially outwards through the rotor as in the '150 patent. Rather, the slurry is injected axially upwards onto a lower face of the rotor. Lifters, or blades, are provided on a lower face of the rotor which throw the slurry radially outwards against the cylindrical screen. A disadvantage of this pellet dryer can be that the lower end of the rotor is not supported. This is because the slurry is directed upwards against the lower face of the rotor. Thus, the rotor is supported only at the top of the dryer, which can be disadvantageous since it is desirable to support a rotating member like the rotor at both ends to maintain axial alignment. Supporting the rotor at only one end can create problems with balance and vibration when the rotor is rotated, especially when rotated under a load as when slurry is being pumped by the rotor through the pellet dryer. Accordingly, it can generally be desirable to support the rotor at both ends to improve efficiency and longevity of the dryer.

Conventionally, it was generally believed that dewatering was best accomplished by impacting the pellets against the dewatering screen to remove the water. However, it has been discovered that dewatering can best be achieved by instead limiting the number of impacts between the pellets and the dewatering screen and increasing the number of impacts between the pellets and the lifters. Residual water on the screen can actually be reacquired by pellets through repeated impacts with the screen. The slurry of pellets and water can typically be introduced into the pellet dryer while the pellets are still hot. The internal heat of the pellets actually assists in the drying process. An additional reason why pellet impacts against the dewatering screen can be disadvantageous is that the screen acts like a "grater," shaving or breaking off pieces of the pellets during impacts. These pieces of pellets, commonly called "fines," can cause other problems with the operation of the pellet dryer and with disposal of the water removed from the slurry. Consequently, lifters which reduce the number of impacts with the dewatering screens can improve the drying efficiency and reduce fines. Lifters can be designed to reduce the number of impacts with the dewatering screens by creating the lifters with an inwardly curved surface which tends to direct the pellets away from the dewatering screen and back in towards the rotor surface and other lifters. This additionally results in increased impacts between the lifters and the pellets.

In prior pellet dryers, generally flat lifter blades are attached to the surface of the rotor in a helix configuration at a 45 degree angle. The 45 degree angle is what "lifts" the pellets upwards through the pellet dryer. The lifters are generally flat in that there is no curvature apart from the helix curvature imparted as a result of attachment to the cylindrical rotor. The flat lifters direct the pellets out into the dewatering screen. The lifters are also conventionally attached to the surface of the rotor in an evenly distributed manner, in that there are the same amount of lifters in each row along the entire length of the rotor. Prior art pellet dryers typically use 5–6 lifters evenly spaced radially around the circumference of the rotor. The lifters are also conventionally aligned horizontally in rows and vertically in columns.

Accordingly, there is a need for a lifter, rotor and pellet dryer apparatus which provides improved dewatering capabilities through increased pellet impacts with the lifters and reduced pellet impacts with the dewatering screen.

SUMMARY

According to the invention, a centrifugal pellet dryer apparatus, rotor and lifter is provided wherein the lifters can have a front surface configured to deflect pellets inwardly toward the rotor surface and other lifters, and the rotor can have lifters attached in a configuration designed to increase pellet impacts with lifter blades as well as providing different regions of lifters wherein different numbers of lifters can be provided in the different regions of lifters along the length of the rotor. The specially configured surface of the lifters tend to control the pellet path, keeping the pellets in the lifter envelope and away from the dewatering screens. The configuration of the lifters on the rotor, generally a higher concentration of lifters on the lower region of the rotor can further create increased pellet impacts with the lifters.

The centrifugal pellet dryer can have an outer housing with a water removal port formed in the outer housing and one or more mesh members disposed vertically within the outer housing. The mesh member can be formed of material that permits passage of water while blocking the passage of pellets therethrough. A vertically disposed rotor with lifters affixed thereto is journaled for rotation coaxially within the dewatering screen to direct pellets upwardly to a pellet discharge port in an upper portion of the dryer. The rotor can have a hollow interior portion coaxial with the rotor and a plurality of radial passages extending between the hollow interior portion and the outer surface of the rotor. A slurry inlet is provided adjacent the bottom of the rotor in communication with the hollow interior portion of the rotor. Slurry introduced through the slurry inlet is conducted through the hollow interior portion of the rotor and through the radial passages which direct the slurry into a space between the outer surface of the rotor and the dewatering screen.

The lifters, also called blades, are provided on the outer surface of the rotor in a helix configuration and are angled approximately 45 degrees which "lifts" the pellets upwardly toward the pellet discharge port. To reduce pellet impacts with the screen, and to increase pellet impacts with the lifters, the surface of the lifters can be configured to direct pellets inwardly towards the rotor and other lifters, and away from the dewatering screen. The number or rows, the number of lifters in each row provided in different regions along the length of the rotor, and spacing/alignment of the lifters affixed to the outer surface of the rotor can be designed to further increase the number of impacts between the lifters and the pellets.

The centrifugal pellet dryer can also be internally chamberized into multiple sections for example: a slurry inlet and initial dewatering section; a secondary dewatering and drying section; and a pellet discharge section. In this three section embodiment, each section can employ a dewatering screen, which may extend for all or only a part of each section.

An exhaust port through the top of the housing can extend into the upper and middle sections for creating a negative pressure, i.e., a vacuum, in those sections to enhance a vertical counter flow of air through the upper and middle sections to pull moisture down from the discharge section. A separator plate can be provided between each section to somewhat seal each section to enhance the effect of the negative pressure to inhibit the upward movement of moisture into the upper drying and discharge sections. A hole can be provided through the separator plates in the upper and middle sections for creating a negative pressure in those sections via the exhaust port. A water seal can be created at the water outlet ports to create an air tight water seal, and the slurry inlet tube can be elbow-shaped to provide a water trap preventing air from entering through the slurry inlet. The water seal and water trap can inhibit air from entering the lower section and moisture laden air from rising up through the dryer.

The centrifugal pellet dryer can also be designed so that the different sections are modular and can thus be interchangeable, as well as for convenience of assembly and disassembly of the dryer. The modular sections can also be designed such that the size of the pellet dryer, with respect to the length, can be varied for a given diameter pellet dryer simply by varying the number of secondary dewatering sections provided between the slurry inlet and pellet discharge sections. The first and last sections would remain the same for a given diameter pellet dryer. However, the length of the rotor would have to be different to accommodate the changing length resulting from the addition or subtraction of secondary dewatering sections.

Portions of the rotor can be provided with different lifter configurations associated with the different sections of the dryer. For example, the lower portion of the rotor which is disposed within the slurry entry and initial dewatering section can be provided with a greater number, and different configuration, of lifters designed to initially separate most of the water out of the slurry. The middle portion of the rotor associated with the secondary dewatering and drying sections can have fewer lifters and can be differently configured. Since most of the water has already been removed in the first section, only the minimum number blades required to maintain an upward travel of the pellets toward the discharge portion are needed in the middle sections.

An air inlet, preferably tangential, communicating the atmosphere with the pellet discharge port can be provided to permit air to be drawn from the atmosphere as the pellets are discharged. The counter-flow air thus created can eliminate the creation of a disadvantageous flow of air drawn through the pellet discharge port which could otherwise occur.

Other features can include a lower bearing for the rotor which runs in water. Failure of the lower rotor bearing due to contamination by water from the slurry is a known problem with conventional centrifugal pellet dryers. Thus, a water-cooled bearing, typically made from a type of plastic, can eliminate such bearing failure problems. For ease of cleaning and maintenance, the outer housing and the screen can be segmented such that they can be along a side and removed from around the rotor. Additionally, the motor can be located directly above the rotor to drive the rotor directly, thus eliminating belts and sheaves that produce radial loads on the rotor bearings. This can result in longer lasting bearings as well as eliminating belts and sheaves which wear out and must be regularly replaced.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figures 1, 2, 3:
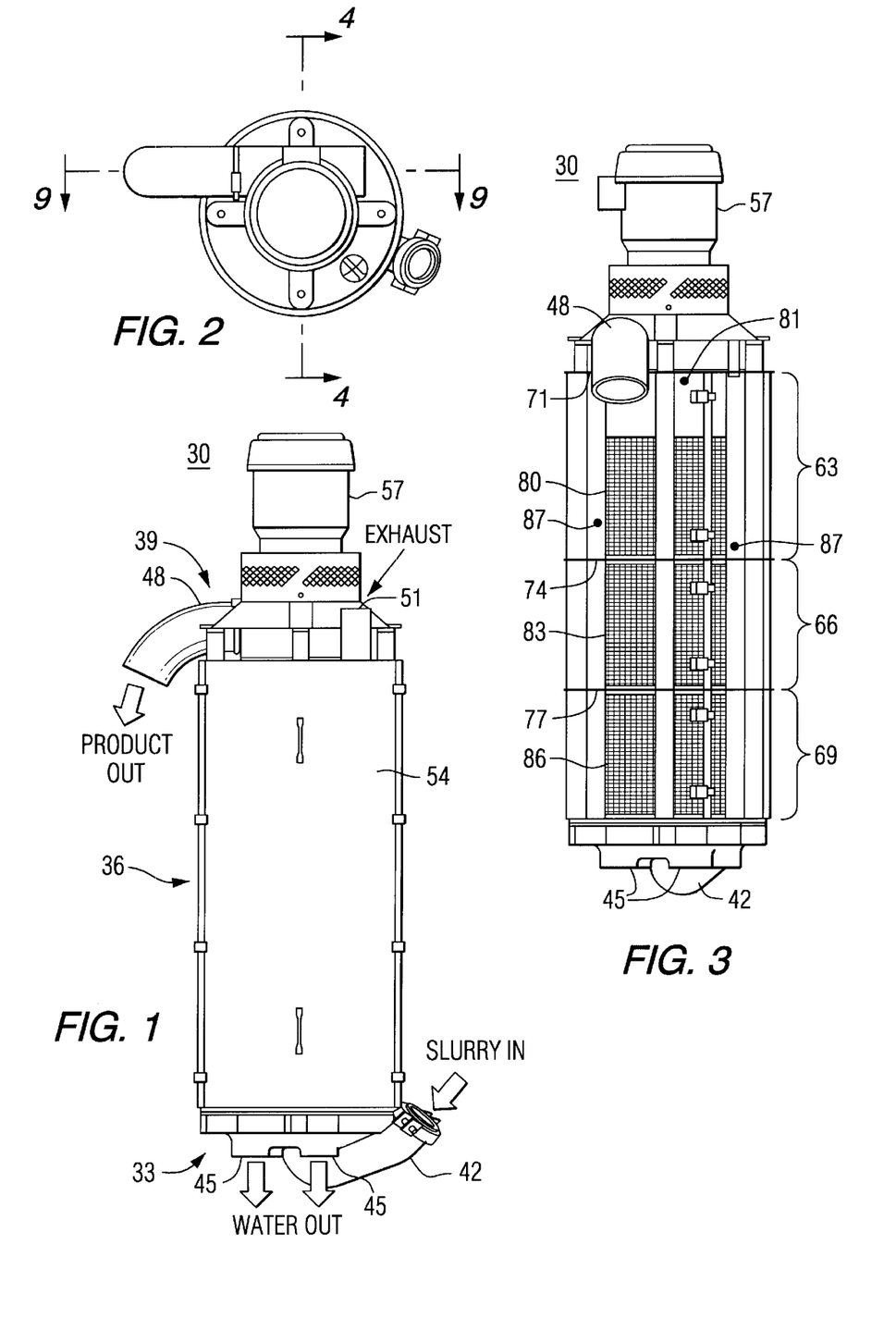
FIG. 1 is a side view of a centrifugal pellet dryer according to the invention.
FIG. 2 is a top view of the centrifugal pellet dryer shown in FIG. 1.
FIG. 3 is a side view of the centrifugal pellet dryer similar to that shown in FIG. 1 having the outer cover removed to show the dewatering screens.

Referring to the drawing figures, wherein like reference numbers refer to similar parts through the several views, a presently preferred embodiment of a centrifugal pellet dryer 30 is shown in FIGS. 1 and 2. The pellet dryer 30 can have a bottom portion 33, an intermediate portion 36 and a top portion 39. The bottom portion can include a slurry inlet 42 for introducing a slurry of pellets and water into the centrifugal pellet dryer 30 and also water outlet ports 45 for discharging water from the slurry. The top portion 39 can include a pellet discharge outlet 48 and can have an exhaust port 51 for applying a vacuum within the pellet dryer 30. The centrifugal pellet dryer 30 is shown in FIG. 3 with the housing 54 removed. The housing 54 can preferably be an outer cover which is openable longitudinally so that it may be opened and removed from around the intermediate portion 36, which permits easy cleaning and 360 degrees of access. This also provides easy access to and removal of dewatering the screens 80, 83, 86. The dewatering screens 80, 83, 86, or other suitable foraminous member, can have openings sized to retain pellets while permitting water separated from the pellets which is thrown off during the drying process to be drained from the pellet dryer 30. Although the preferred embodiments utilize multiple separate dewatering screens, it is to be understood that a single screen could also be used. FIG. 3 illustrates an embodiment of the centrifugal pellet dryer 30 that can have three sections 63, 66, 69 each divided by a separator plate 71, 74, 77. Each section can include a cylindrical dewatering screen 80, 83, 86. Alternatively, a separator plate need not be provided between every dewatering screen 80, 83, 86. Similarly, one of the single dewatering screens illustrated could be replaced by two shorter dewatering screens with no separator plate therebetween. In other words, although separator plates can be used to section the pellet dryer into chambers by providing them between dewatering screens, each individual dewatering screen need not define each chamber. Rather, the separator plates define the chambers, and one or more dewatering screens may be disposed in each chamber.

Each dewatering screen 80, 83, 86 may extend the entire length of a section 63, 66, 69, such as shown in the first two sections 66, 69. However, a dewatering screen may also have a non-foraminous portion 81 such that the screened portion may extend only partially the length of a section, as in the upper section 63. In the top section 63, it can be preferable that the non-screened top portion 81 be provided because it has been determined that, this can aid in creating a downward air flow in the gap 87 outside the dewatering screens 80, 83, 86. It can also inhibit the upward travel of moisture up through the gap 116 between the rotor 89 and the dewatering screens 80, 83, 86 from the lower regions of the pellet dryer 30 near the slurry inlet 42. Openings can be provided in one or more of the separator plates 71, 74, 77, shown best in FIGS. 13 and 14, to permit a vacuum applied via the vacuum/exhaust port 51 to be applied in one or all of the lower sections 66, 69. Each dewatering screen 80, 83, 86, like the outer housing 54, can be opened along a longitudinal length thereof for convenient removal from around a rotor, as shown in FIGS. 4–12, which is positioned for rotation within the centrifugal pellet dryer 30. The separator plates 71, 74, 77 can be utilized, and in combination with providing a vacuum via exhaust port 51, to inhibit the upward movement of moisture from the lower section 63 of the pellet dryer 30 into the upper sections 66, 69. It has been determined that the separator plate 71, 74, 77 help to create a negative pressure in the sections which works with the negative pressure, i.e., vacuum, which can be created via exhaust port 51. An opening through one or all of the separator ports (shown best in FIGS. 13–16) can be provided so that the vacuum created via exhaust port 51 can be created within one or more of the sections 63, 66, 69.

Additionally, the water outlet ports 45 enable creation of an airtight seal and the slurry inlet 42 creates a water trap, inhibiting the entry of air. The slurry inlet 42 and the water outlet ports 45 are sealed to prevent air from entering the lower section and moisture laden air from raising up through the upper portions 63, 66 of the pellet dryer 30.

Figure 4:
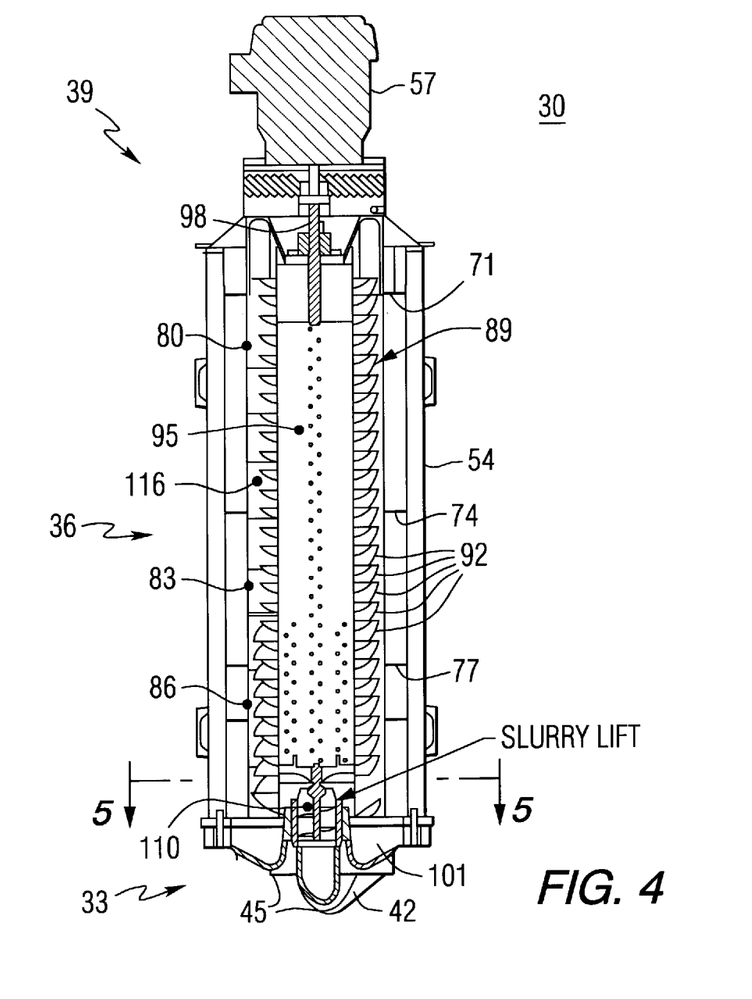
FIG. 4 is a section view taken along line IV—IV in FIG. 2.
Figure 5:
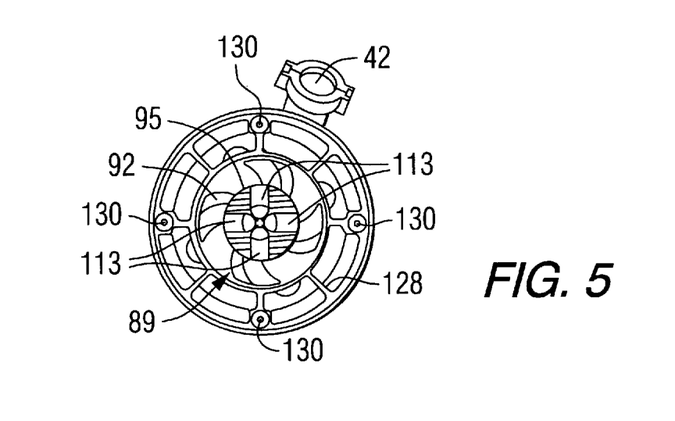
FIG. 5 is a section taken along the line V—V in FIG. 4.
Figure 6:
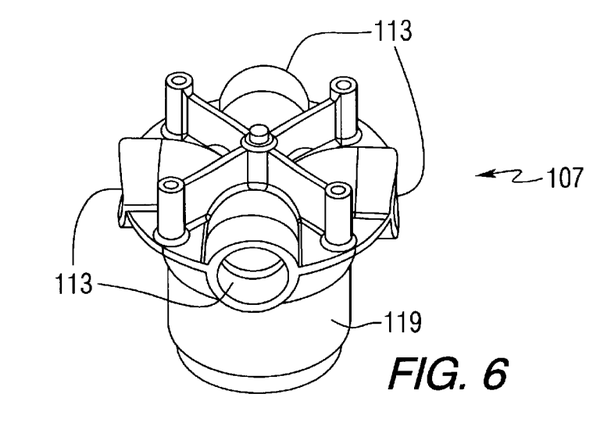
FIG. 6 is a perspective view of an embodiment of a rotor manifold.
Figure 7:
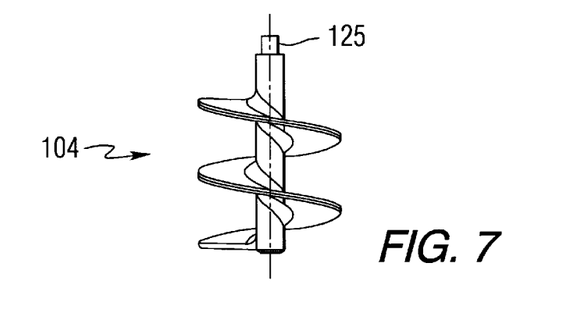
FIG. 7 is an embodiment of a feed auger.
Figure 8:
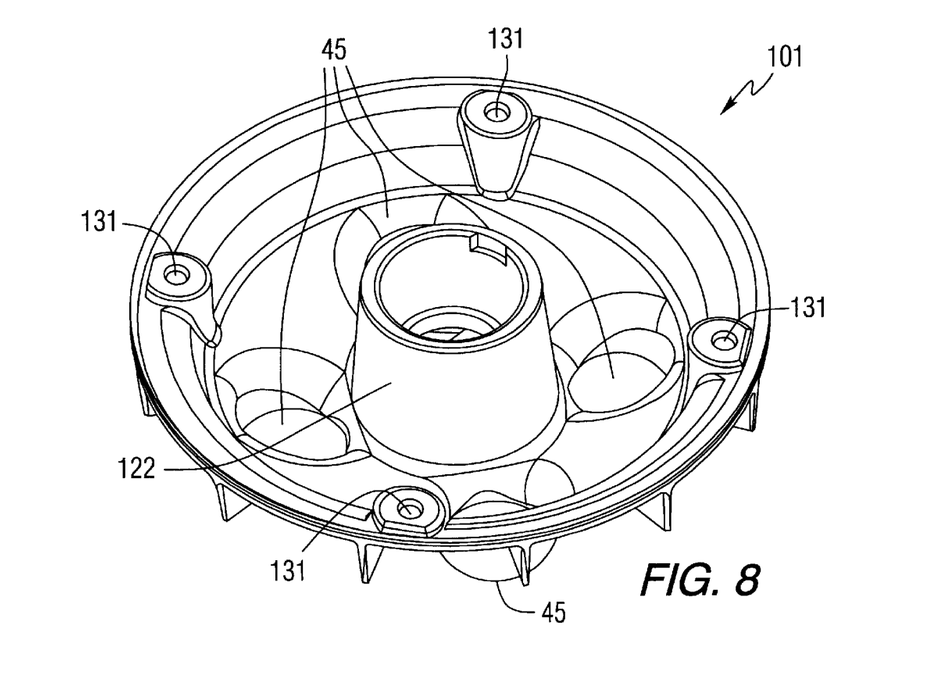
FIG. 8 is an embodiment of a base member.

Additional details of the pellet dryer 30 are illustrated in FIG. 4, a cross sectional view taken along line IV—IV in FIG. 2, wherein the structure inside the outer cover 54 and the dewatering screens 80, 83, 86 is shown. As can be seen, the centrifugal pellet dryer 30 can include a rotor 89 positioned therein for rotation generally in the center of the pellet dryer 30, within the dewatering screen 80, 83, 86. The rotor 89 can have a number of lifters 92, also called blades, affixed to the outer surface 95 thereof for both separating the pellets from the water slurry and carrying the pellets upwardly within the pellet dryer 30 and out through the discharge port 48. The rotor 89 can preferably be supported at both upper and lower ends thereof. The upper end of the rotor 89 includes a shaft 98 which can be connected to a drive shaft of the motor 57 positioned on the top portion 39 for rotating the rotor 89 directly. Connecting the rotor 89 directly to the output shaft of the motor 57 can be desirable since it eliminates the use of belts and sheaves that produce a radial load on bearings, and which require regular maintenance and would thus increase the cost and downtime of the pellet dryer 30.

Further details of the lower portion 33 of the centrifugal pellet dryer 30 are shown in FIGS. 5 through 8. Particularly, the bottom portion 33 can include a base member 101, a feed auger 104, and a rotor manifold 107 are shown. The rotor manifold 107 can be connected between the lower end of the rotor 89 and the base member 101. As best shown in the cross section view in FIG. 4, the rotor manifold 107 has a hollow interior portion 110 which is in fluid communication with the slurry inlet port 42. The rotor manifold 107 can also have a number of radially extending passages 113 connecting the hollow interior portion 110 of the rotor manifold 107 to a gap 116 between the outer surface 95 of the rotor 89 and the surrounding dewatering screens 80, 83, 86, shown best in FIGS. 5 and 6. The slurry of water and pellets can be conducted by the feed auger 104 from the slurry inlet port 42 in the base member 101 into the hollow interior portion 110 of the rotor manifold 89. As the rotor 89 is being rotated by the motor 57, the slurry is conducted through the radially extending passages 113 and directed radially outwards into the gap 116 between the rotor 89 and the dewatering screen 80, 83, 86. As shown best in FIGS. 6 through 8, the rotor manifold 107 has a lower portion 119 which is adapted to be received in a receptacle portion 122 formed in the base member 101. The auger feed 104 can be positioned in the hollow interior portion 122 and have a shaft portion 125 connected to the lower end of the rotor 89 for rotation therewith. The feed auger 104 can be utilized to generate an initial slurry lift—to begin the flow of the slurry upwardly through the hollow interior portion 110 of the rotor manifold 107 and out through the radially extending passages 113 until the rotation of the rotor 89 and the lift blades 92 begin to pump the slurry through the pellet dryer 30. The slurry lift provided by the auger feed 104 permits the slurry level to be flush with the bottom of the pellet dryer 30. Other components at the base portion 33 of the pellet dryer can include a base plate positioned over the base member 101, shown best in FIG. 5, which can be connected to the base member 101 using fasteners connect via a number of fastener openings 130 in the base plate 128 which are positioned to align with fastener openings 131 in the base member 101. One manner of assembling an embodiment of a multi-sectioned centrifugal pellet dryer will be explained more below, in connection with FIGS. 13 and 14.

Figures 9, 10, 11:
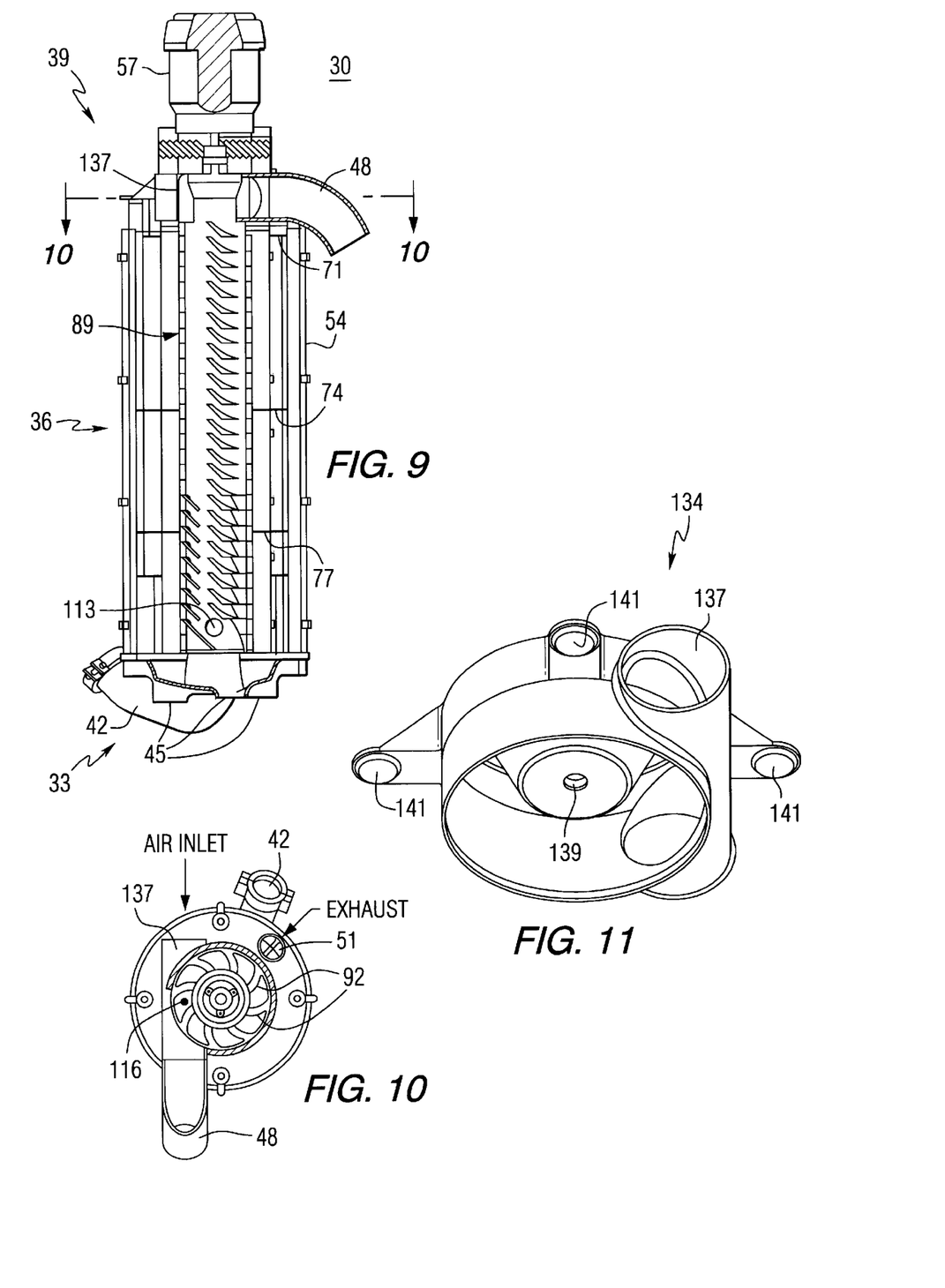
FIG. 9 is a cross section taken along line IX—IX in FIG. 2.
FIG. 10 is a section view taken along the line X—X in FIG. 9.
FIG. 11 is a perspective view of a pellet discharge member.

Referring now to FIGS. 9 through 11, another cross sectional view of an embodiment of the centrifugal pellet dryer 30 is illustrated showing more details of the upper portion 39, and particularly a pellet discharge member 134. In the section view illustrated in FIG. 10, the pellet discharge member 134 can be seen along with the exhaust port 51. A perspective view of an embodiment of a pellet discharge member 134 is shown in more detail in FIG. 11. As can be seen in FIGS. 9 and 10, a tangential air inlet 137 can be provided in communication with the pellet discharge port 48. The tangential air inlet 137 facilitates the discharge of dried pellets by providing for counter flow air. Without the tangential air inlet 137, the flow of exiting pellets would be slowed because air would be drawn in through the pellet discharge port 48. The pellet discharge member 134 can be attached to the centrifugal pellet dryer 30 utilizing multiple fastener openings 141, in the same manner as the fastener openings used to attach the base member 101 and the base plate 128. As explained above, details of a manner of assembling a pellet dryer are described in more detail in connection with FIGS. 13 and 14.

Figure 12:
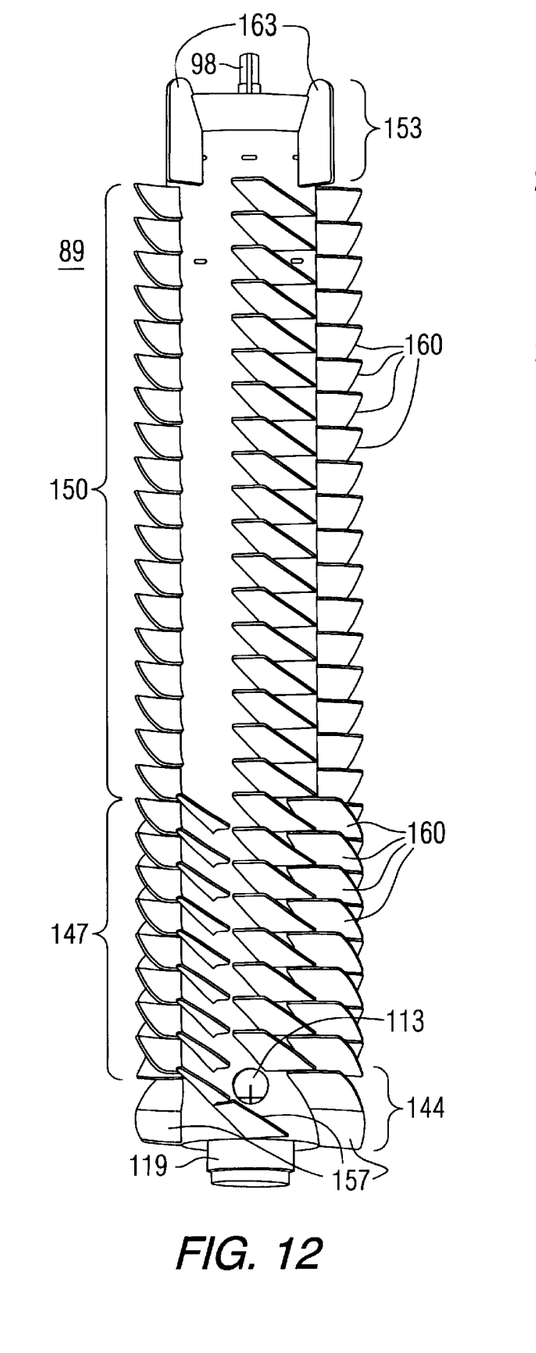
FIG. 12 is a side view of an embodiment of a rotor.

Referring now to FIG. 12, an embodiment of a rotor is 89 illustrated which, as shown, can have different lifter 92 configurations for different regions of the rotor 144, 147, 150, 153. Generally, the rotor 89 can have a greater concentration of lifters 92 provided in region 147. The greater concentration of lifters can aid in providing the desired increase in the number of impacts between lifters and pellets. The lifters 92 are positioned to "fill gaps" between lifters 92 in upper or lower adjacent rows. In other words, the lifters 92 are not aligned with lifters 92 in adjacent rows whereby there is no unobstructed "path" between rows of lifters: the top edge of a lifters 92 in one row is vertically aligned with the bottom edge of a lifter 92 in the row immediately above. Vertical spacing was determined through simulation. Matching vertical blade gap to pellet velocity and blade speed can provide the greatest transfer of pellets from the front of one lifter to the back of the lifter in a row directly above. Reducing the vertical blade gap induced a spiral effect, increasing the vertical speed of the pellets, reducing the drying time and number of impacts. Increasing the vertical blade gap would cause the pellets to miss the back of the blade above. This resulted in losing control of pellet path, reducing the drying time and number of impacts.

Although the rotor 89 is shown as a preferred type of rotor having rotor manifold 107 with hollow interior portion 110 and radially extending passages 113, it is to be understood that the invention is not limited to this preferred type of rotor. In particular, any conventional centrifugal pellet dryer rotor could be used wherein lifters according to the invention are affixed to the rotor outer surface in a pattern according to the invention to obtain the results described herein.

A first, lower-most region 144 of the rotor 89 have a single row of lifters which can generally be longer than the lifters in other regions of the rotor 89. These lifters 157, which are generally adjacent slurry output from the radial passages 113 in the rotor manifold 107, can be longer to initially contact the slurry of pellets and water as it first enters the gap 116 between the rotor outer surface 95 and the dewatering screen 86. The next region 147 of the rotor 89 can be configured with standard sized lifters 160, but with more rows of lifters 160 and a larger number of lifters 160 in each row. A third region 150 of the rotor 89 can generally be a longer portion of the rotor 89 having more rows of lifters. However, there can be a fewer number of lifters 160 in each row, and the spacing between lifters can thus be greater. A fourth region of the rotor 89, generally adjacent the pellet discharge port 48, can have a single row of flat vertical exit blades 163 to facilitate discharging the dried pellets out the pellet discharge port 48. The exit blades 163 and the discharge chamber are designed to change the direction and focus the upward flow of pellets tangentially out the pellet discharge port 48.

According to the invention, a larger number of lifters and rows of lifters are provided on the surface 95 of the rotor 89 in the second 147 and third regions 150 to provide a more efficient drying of the pellets. The majority of the water is shed from the slurry as the first row of lifters 157 sweep the entering slurry upwards. However, a large part of the dewatering Reprocess occurs as the pellets progress upwards through the second region 147. In the second region 147, the lifters 160 are more numerous and are specially contoured to direct the pellets not only upwards toward the pellet discharge port 48, but also inwards toward the surface 95 of the rotor 89, and the next row of lifters 160. Directing the pellets inwards reduces the number of impacts between the pellets and the dewatering screens 80, 83, 86, which enhances the drying process. Drying can be degraded by increased impacts between the pellets and the dewatering screens 80, 83, 86 because droplets of water that are retained on the dewatering screens can be reacquired by the pellets through repeated impacts with the dewatering screens. Thus, limiting pellet impacts with the dewatering screens 80, 83, 86 can enhance the drying process. Another problem with screen impacts is that the screen can act as a "grater" which shaves, or breaks off pieces of the pellets. These pieces of pellets, called "fines," can negatively effect the process in a number of ways, for example by contaminating the discharged water and by "gumming" up the dewatering screens, bearings, and other parts of the pellet dryer 30.

The third region 150 of the rotor 89 can require fewer lifters 160 because most of the dewatering has been accomplished in the first 144 and second 147 regions. The main factor effecting the number of lifters 160 in the third region 150 is providing sufficient time to vaporize remaining water by maintenance of the controlled upward movement of the pellets toward and out through the pellet discharge port 48. Accordingly, only the number of lifters 160 required to maintain a slower controlled upward flow of the pellets need be provided on the rotor surface 95 in the third region 150. Some of the drying effected in the second 147 and third 150 regions can be the result of internal heat of the pellets. Since the pellets may often be delivered in a slurry to the centrifugal pellet dryer 30 directly after the pelletization process, the pellets can typically still contain some internal heat. In the second 147 and third 150 regions of the centrifugal pellet dryer 30, limiting screen contacts, and thus limiting contact with water droplets on the dewatering screens 80, 83, 86, permits the internal heat of the pellets to continue the drying process while the pellets are carried upwards. In a presently preferred embodiment, 8 lifters 160 can be utilized in each row in the second region 147 whereas half as many lifters 160 can be used in each row in the third region 150. However, the number of rows in each region 144, 147, 150, 153, and the number of lifters in each row, can be dependent upon the length and diameter of the rotor 89.

It should also be understood that the "regions" 144, 147, 150, 153 of the rotor 89 are not necessarily coextensive with each section 63, 66, 69 of the pellet dryer 30—which are generally defined by the separator plates 71, 74, 77. In particular, regions of different lifter configurations on the rotor 89 need not be confined to any single section 63, 66, 69 of the pellet dryer 30 or any single dewatering screen 80, 83, 86. In other words, any particular region 144, 147, 150, 153 of the rotor 89 may extend through adjacent sections 63, 66, 69 and/or dewatering screens 80, 83, 86.

Figure 13:
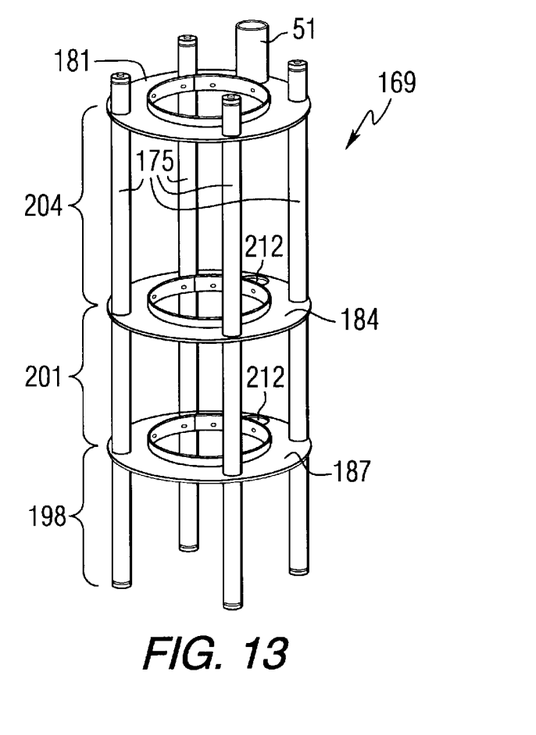
FIGS. 13 and 14 are perspective views of embodiments of structural members of a pellet dryer.
Figure 14:
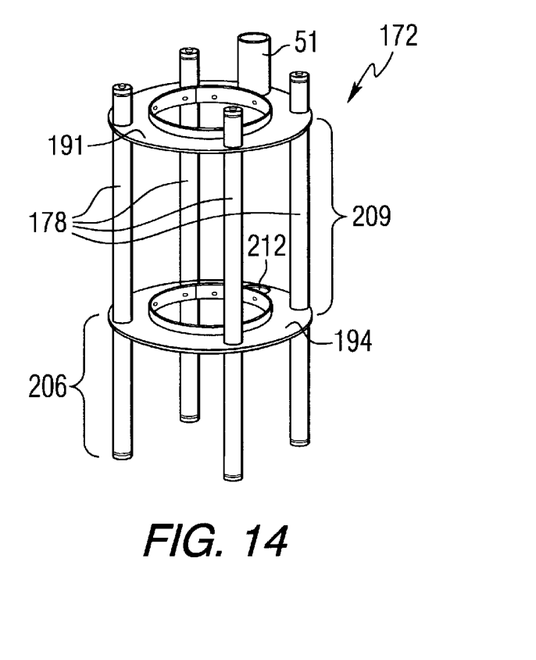
Figures 15, 16, 17, 18:
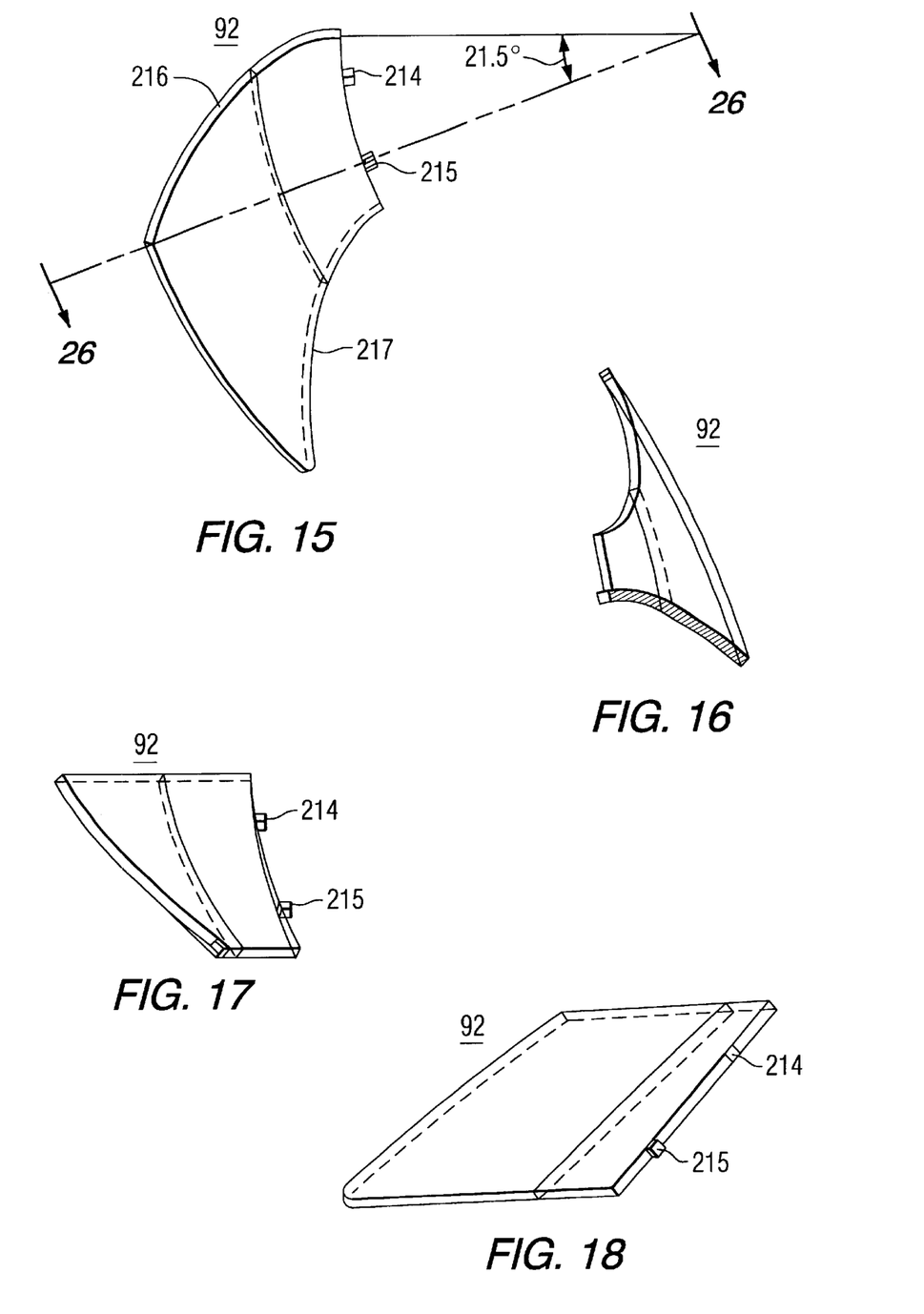
FIGS. 15–18 are perspective views of a presently preferred embodiment of a lifter having an inwardly deflecting surface.
Figure 19:
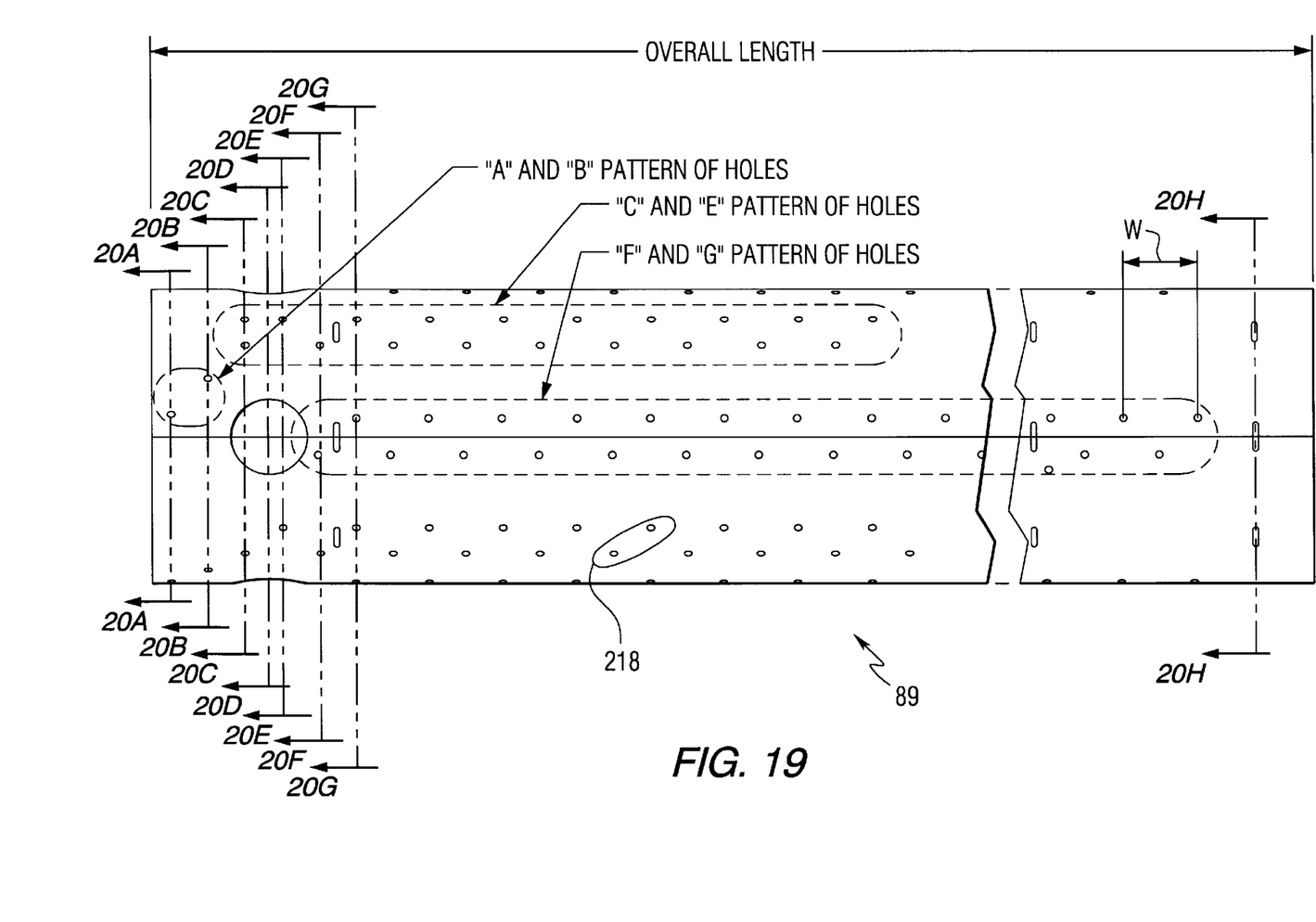
FIG. 19 is a side view of a rotor blank illustrating a presently preferred lifter attachment pattern.

Regarding assembly of a preferred embodiment of the pellet dryer 30, FIGS. 13 and 14 illustrate internal frame members 169, 172 having a number of vertically extending support members 175, 178, four in these embodiments, which can provide the primary structural framework for the centrifugal pellet dryer 30. As shown, separator plates 181–194 can be utilized at various positions along the vertical supports 175, 178 to divide the pellet dryer 30 into different sections. These sections can generally separate the centrifugal pellet dryer 30 into a number of distinct chambers, such as the three sections 198–204 shown in FIG. 13, or the two sections 206, 209 shown in FIG. 14. The separator plates can be provided with openings 212 which can permit a vacuum created via exhaust port 51 to be applied to each chamberized section 198–204 to improve the drying process, as explained previously in connection with the description of FIG. 3. However, more than three sections, or a single section, could also be utilized according to the invention. The vertical support members 175, 178 can be a single cylindrical member or may be assembled from sections which fasten together, such as at the junctions of the separator plates 181–194 and the vertical supports. The pellet dryer 30 can be assembled by connecting the base member 101, with the base plate 128 thereon, to the bottom of the vertical support members 175, 178 via mating fastener openings provided in the base member 101, the base plate 128, and in each end of each vertical support 175, 175, through which an appropriate fastener can be disposed to join the components together. Next, the rotor 89, with the rotor manifold 107 connected thereto, can be disposed down through the center opening formed in each separator plate such that the lower portion 119 of the rotor manifold 107 is connected within the receptacle 122 formed in the base member 101. Of course, the water bearing 318 and seal 324 can be installed earlier if appropriate. The pellet discharge member 134 can be connected over the top end of the rotor 89 with the rotor shaft member 98 disposed through an opening 139 provided in the pellet discharge member 134 for connecting the rotor shaft member 98 to the output shaft of the motor 57, which can be connected atop the pellet discharge member 134. The pellet discharge member 134 can be connected to the vertical support members via mating fastener openings provided therein to connect to each vertical support 175, 178. The dewatering screens 80–86 can be removably positioned in each section 63–69, or 198–209, around the rotor 89 and secured in place. Finally, the outer cover, or housing 54, can be removably positioned over the entire framework 169, 172 and secured in place. To operate the pellet dryer 30, a source of slurry can be connected to the slurry inlet 42 and the motor 57 operated to rotate the rotor 89 to begin pumping the slurry through the pellet dryer 30.

A presently preferred embodiment of a lifter 92 which can be affixed to the surface 95 of the rotor 89, or, it is to be understood, to any prior art rotors for conventional centrifugal pellet dryers, is illustrated in FIGS. 15 through 18. Typically, the lifter 92 is affixed to the cylindrical rotor surface 95 at an upwardly inclined angle of 45 degrees, thus defining a typical helix curvature. Additionally, as explained previously, the lifter 92 can preferably be configured to deflect the pellets inwardly toward the surface 95 of the rotor 89 in order to limit the number of impacts between the pellets and the dewatering screen 80, 83, 86. A presently preferred configuration for the lifter 92 is to provide an inwardly curved surface on the front face of the lifter, wherein the front face is facing the direction of rotation of the rotor 89. The inwardly curved surface tends to control the pellet path, keeping the pellets in the lifter envelope and away from the dewatering screens. The arrangement of the lifters on the rotor, generally a higher concentration of lifters on the lower region of the rotor, works in combination with the inwardly curved surface of the lifters 92 to provide increased pellet impacts with the lifters. When a pellet hits a lifter 92, water is transferred to the lifter 92 and centrifugal force works that water out to the dewatering screens 80, 83, 86. Thus, the lifter 92 is generally continuously cleaning itself of water. However, although much of the water passes through the dewatering screens 80, 83, 86, some of the water is retained on the inside surface of the screens 80, 83, 86 where it can be reacquired by pellets impacting the screen. Pellet impacts with the dewatering screens are therefore generally undesirable—hence advantage of inwardly contoured lifters 92. Consequently, it is clear that it is the inwardly curving shape of the lifter, and/or in the configuration of lifters, e.g., more or fewer lifters in each row in different regions along the length of the rotor, which results in much of the advantages obtained according to the invention.

Generally, the contour of a presently preferred embodiment of the lifter 92, which generally corresponds to lifter 160 in FIG. 12, can best be described as being characterized by the top and bottom edge of the lifter 92 defining an involute curve. The lifters 144 in FIG. 12 can have the identical curvature, except that the lifters 144 are longer—twice as long in a preferred embodiment. It should also be understood that the lifters are attached to the rotor in a conventional 45 degree helix configuration. The 45 degree helix configuration provides the lift to carry the pellets upwards through the pellet dryer 30. However, it is the involute curvature, i.e., the inwardly curving aspect, of the lifter 92 which can reduce the number of screen impacts. contour of such a lifter 92 can be dependent on the diameter of the rotor 89. For presently preferred lifter can have a curvature defined by the following equations:

Xcoord=Inner Radius (COS Degree+Radian×SIN Degree)

Ycoord=Inner Radius (SIN Degree+Radian×COS Degree)

The following table contains values for Xcoord and Ycoord which could be create a presently preferred lifter having an involute curvature defined by those equations.

| Degree | Radian | Inner | Xcoor | Ycoord | Outer/Inner |
|--------|--------|-------|-------|--------|-------------|
| 1 | 0.017 | 4.000 | 4.001 | 0.000 | 1.71875 |
| 3 | 0.052 | | 4.005 | 0.000 | |
| 5 | 0.087 | | 4.015 | 0.001 | |
| 7 | 0.122 | | 4.030 | 0.002 | |
| 9 | 0.157 | | 4.049 | 0.005 | |
| 11 | 0.192 | | 4.073 | 0.009 | |
| 13 | 0.227 | | 4.102 | 0.015 | |
| 15 | 0.262 | | 4.135 | 0.024 | |
| 17 | 0.297 | | 4.172 | 0.035 | |
| 19 | 0.332 | | 4.214 | 0.048 | |
| 21 | 0.366 | | 4.260 | 0.065 | |
| 23 | 0.401 | | 4.309 | 0.085 | |
| 25 | 0.436 | | 4.363 | 0.109 | |
| 27 | 0.471 | | 4.420 | 0.136 | |
| 29 | 0.506 | | 4.480 | 0.168 | |
| 31 | 0.541 | | 4.543 | 0.205 | |
| 33 | 0.576 | | 4.609 | 0.246 | |
| 35 | 0.611 | | 4.678 | 0.293 | |
| 37 | 0.646 | | 4.749 | 0.344 | |
| 39 | 0.681 | | 4.822 | 0.401 | |
| 41 | 0.715 | | 4.896 | 0.464 | |
| 43 | 0.750 | | 4.972 | 0.532 | |
| 45 | 0.785 | | 5.050 | 0.607 | |
| 47 | 0.820 | | 5.127 | 0.687 | |
| 49 | 0.855 | | 5.206 | 0.774 | |
| 51 | 0.890 | | 5.284 | 0.867 | |
| 53 | 0.925 | | 5.362 | 0.967 | |
| 55 | 0.960 | | 5.439 | 1.074 | |
| 57 | 0.995 | | 5.516 | 1.187 | |
| 59 | 1.030 | | 5.590 | 1.307 | |
| 61 | 1.064 | | 5.663 | 1.433 | |
| 63 | 1.099 | | 5.734 | 1.566 | |
| 65 | 1.134 | | 5.803 | 1.707 | |
| 67 | 1.169 | | 5.868 | 1.853 | |
| 69 | 1.204 | | 5.930 | 2.007 | |
| 71 | 1.239 | | 5.989 | 2.167 | |
| 73 | 1.274 | | 6.043 | 2.334 | |
| 75 | 1.309 | | 6.093 | 2.507 | |
| 77 | 1.344 | | 6.137 | 2.687 | |
| 79 | 1.379 | | 6.177 | 2.873 | |
| 81 | 1.413 | | 6.211 | 3.065 | |
| 83 | 1.448 | | 6.239 | 3.262 | |
| 85 | 1.483 | | 6.260 | 3.466 | |
| 87 | 1.518 | | 6.275 | 3.675 | |
| 89 | 1.553 | | 6.282 | 3.889 | |
| 91 | 1.588 | | 6.282 | 4.108 | |

Although a preferred embodiment of the lifter 92 comprises providing an involute curvature, such as according to the foregoing equations, it will be appreciated by those skilled in the art that various other configurations of the lifter 92 could be devised which also deflect pellets inwardly toward the rotor surface away from the dewatering screens. For example, other equations which define an inwardly curving surface could be formulated. Also, the lifter 92 surface could be formed from a series of flat surfaces bent or joined at angles to each other define a surface which depends inwardly toward the rotor surface. Additionally, a less sophisticated configuration could be to simply provide a flanged, or bent, portion at the outermost edge of the lifter 92. The flanged portion could be angled toward the direction of rotation of the rotor such that pellets striking the flanged portion would be deflected toward the surface of the rotor and other lifters.

The vertical spacing between rows of lifters 92 can preferably be set to eliminate any horizontal gaps between the rows. The number of lifters 92 in each row can be dependent upon the diameter of the rotor 89 and the speed of rotation. The spacing between each lifter 92 in rows in, for example, the second region 147 in FIG. 12, is set to minimize pellet slippage and provide a maximum amount of impacts between pellets and the lifters 92. For example, in an embodiment of a rotor having an 8 inch diameter and rotated at about 1200 rpm, 8 lifters can be used in each row. In the third region 150, for example, resonance only requires a minimum number of impacts to keep the pellets moving upwardly and to provide time for internal heat of the pellets to vaporize any remaining film of water on the surface of the pellets. In the example embodiment described above using 8 lifters in each row in the second region 147, only 4 lifters in each row of lifters in the third region 150 can be needed to satisfy the requirements described above. The number of rows of lifters in each region can be largely dependent upon the length and diameter of the rotor 89. Generally, the lifters 92 are contoured and configured to create, as an example, a pellet path described as follows:

A pellet hits the front of one lifter which accelerates and lifts the pellet to the next row of lifters. The pellet hits the back of the lifter in the row directly above, which decelerates and stops the lift of the pellet. The pellet then hits the front of a following lifter in the same row, which accelerates and lifts the pellet up to the next row of lifters. The process repeats until the pellet reaches the pellet discharge port.

Consequently, the configuration of the front surface of the lifter 92 and the arrangement of the lifters 92 on the rotor 89 permits some degree of control over the pellet path to optimize and control the process. For example, the top of one row of lifters 92 can be vertically aligned with the bottom of an adjacent row of lifters 92. Vertical spacing has been determined, such as by using computer simulation, to match vertical gap between rows of lifters 92 to pellet velocity and lifter speed (rotational speed of the rotor) to provide the greatest transfer of pellets from the front of a lifter 92 in one row to the back of a lifter 92 in the row directly above. Reducing the vertical gap, from an optimal distance, induces a spiral effect, which can undesirably increase the vertical speed of the pellets, thus reducing the available drying time and number of impacts between the pellets and the lifters. Additionally, providing too large a gap can result in the pellets missing the back of lifters in an upper adjacent row, which can disadvantageously result in a loss of control over the pellet path, also reducing impacts between pellets and lifters and reducing the available drying time.

A presently preferred rotor diameter can be 8 inches, but could be smaller or much larger, such as 36 inches. The height of each lifter 92, and the spacing therebetween, can be dependent on the rotational speed at which the rotor 89 is operated. A presently preferred speed is a standard motor speed of 1150–1200 rpm, although a range of about 700 to 1800 rpms can also be utilized. Other factors in the system include the diameter of the rotor 89 at the outer tip the lifters 92. For an 8 inch diameter rotor 89, a presently preferred diameter at the outer tip of the lifters 92 can be 13.75 inches. The surrounding dewatering screens, 80, 83, 86 can have a presently preferred diameter of 14 inches. However, variations of these dimensions can be provided satisfactorily employed according to the invention. In general, computer simulation was used in the development of the invention to optimize certain elements of the lifter contour land configuration for various rotor diameters, lengths, rotational speeds, and other factors. Thus, pellet dryers having different operational requirements can be designed in accordance with the invention but with customized elements, such as lifter contour, configuration of lifters on the rotor, rotor diameter, length and rotational speed, number of chamberized sections of the pellet dryer, and the like.

Referring to FIGS. 19 and 20A–20H, a manner of providing a presently preferred configuration of lifters or the rotor 89 is illustrated wherein attachment points on the rotor 89 for each lifter are provided. The layouts in FIGS. 19 and 20A–20H to provide a pattern for a presently preferred configuration of lifters on a rotor having an 8 inch outside diameter. The number of rows of holes "F" and "G" can vary depending upon the length of the rotor 89. For example, a pellet dryer 30 with 3 sections, as shown in FIG. 3, could have a 8 inch diameter rotor 89 with an overall length of 59 inches and 26 rows of holes "F" and "G." Alternatively, a four screen model could have an overall length greater than seven feet and more than 30 rows of holes "F" and "G." It should be observed that the pairs of attachment holes, reference number 218 for example, must be space and positioned to correspond to the attachment pins 214, 215 provided on the lifter 92. In a preferred embodiment, the distance "w" between each pair of attachment holes can be the same, and can be 2 inches.

Figure 20A:
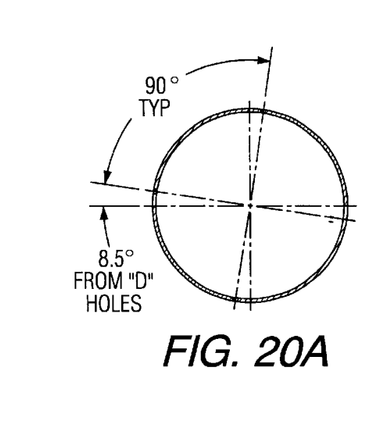
FIGS. 20A–20H are section views corresponding to sections A—A through H—H in FIG. 19.
Figure 20B:
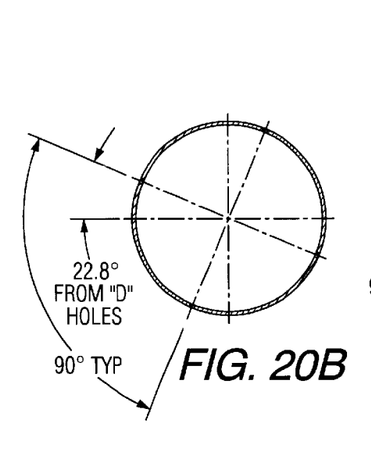
Figure 20C:
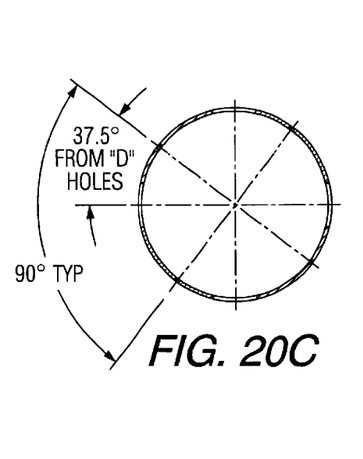
Figure 20D:
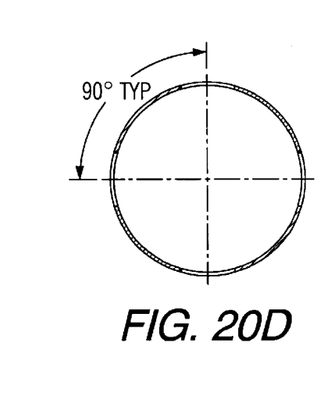
Figure 20E:
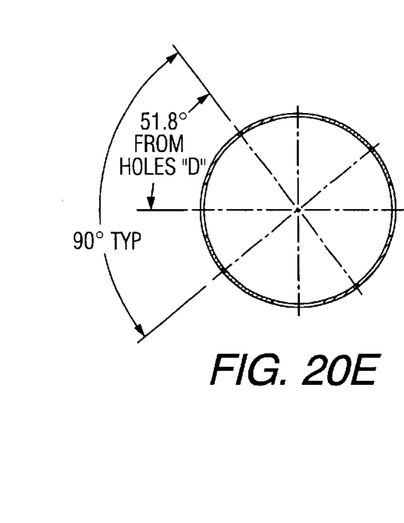
Figure 20F:
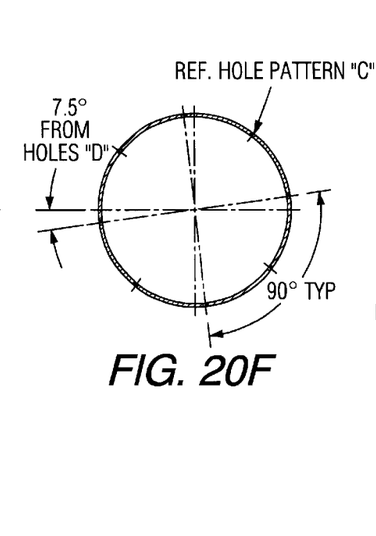
Figure 20G:
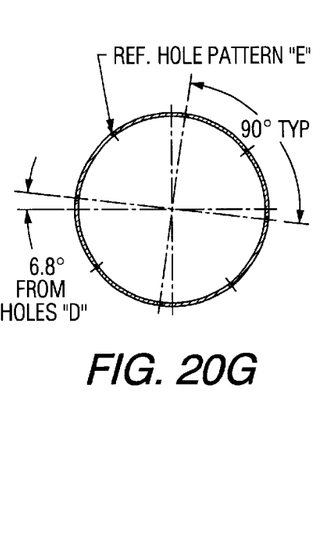
Figure 20H:
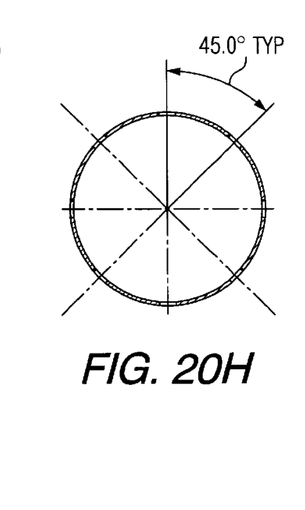

In FIGS. 20A, 20B, 20D and 20E, the pattern is for attaching the longer lifters, i.e., lifters 157 in FIG. 12. Four lifters are provided equally spaced around the diameter. FIG. 20C indicates that four openings equally spaced around the diameter are provided for the radially extending passages 113 through which the slurry is conducted from the rotor manifold 107 into the pellet dryer 30. As shown in FIG. 12, preferably 8 lifters 92 can be provided in region 147 of the rotor 89, i.e., the first 8 rows of lifters 92. Thereafter, only 4 lifters 92 can be provided in region 150 of the rotor 89, e.g., each of the 18 subsequent rows of lifters. As described above, a presently preferred 3-screen embodiment of the rotor 89 can have 26 rows of holes "F" and "G," for attaching the 8 rows of 8 lifters 92 and subsequent 18 rows of 4 lifters 92.

Figure 21:
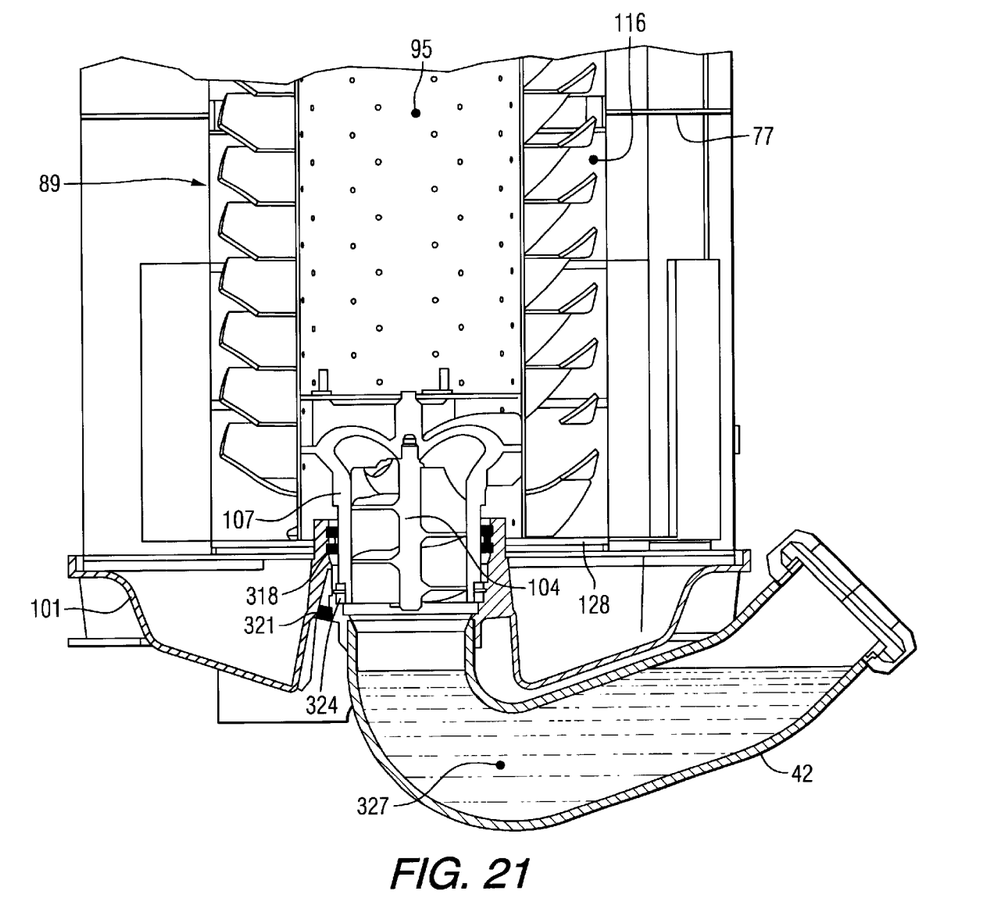
FIG. 21 is a section view showing a bearing which runs in water.
Figure 22:
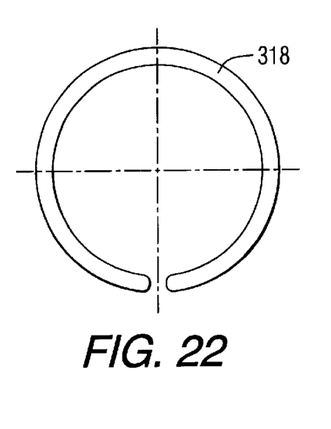
FIG. 22 is a top view of the water bearing in FIG. 21.
Figure 23:
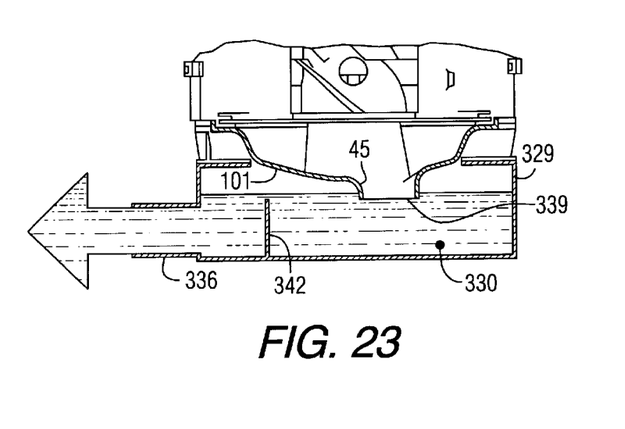
FIG. 23 is a side cross-section view of an embodiment of the lower portion of a pellet dryer.

Further aspects of a preferred embodiment of the invention are illustrated in FIGS. 21 through 23 which show additional details of the lower end to the pellet dryer 30. As shown, the rotor manifold 107 is supported by a bearing 318 which runs in ordinary water. The water bearing 318, shown best in FIG. 22, can be "cooled" using fresh make up water provided via a water inlet 321. Use of a water bearing 318 avoids a common problem with conventional pellet dryers wherein water from the slurry migrates into the rotor bearings thus ruining the bearing and requiring premature replacement. In the present case the bearing 318 is designed to run in water so premature failure due to water contamination can be entirely eliminated. Additionally, a seal 324 can be used at the interface between the slurry inlet 42 and the rotor manifold 107. As shown in FIG. 21, the slurry inlet 42 creates a water trap 327 which, along with the seal 324, seals the slurry inlet 42. FIG. 23 illustrates a water containment member 329 attachable to the base member 101 which collects water 330 discharged through water discharge outlets 45 and subsequently diverts the discharged water 330 through drain 336. The water containment member 329 can have a wall portion 342 between the drain 336 and the water discharge outlets 45. The wall portion 342 acts like a dam which and helps to maintain the water 330 in the water containment member 329 at a level just above the opening of the water discharge outlets 45 such that a water seal is created. The water trap 327 created by the slurry inlet 42 and the water seal created by the water containment member 329 work to prevent air from entering into the lower dewatering regions 144, 147 and moisture from rising up through the pellet dryer 30 as the pellets are carried upwards toward the pellet discharge outlet 48. These features can enhance the advantages obtained using the application of a vacuum via the exhaust port 51, as previously described herein.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A rotor for a centrifugal pellet dryer comprising:
   a. an outer surface;
   b. a plurality of lifters affixed to said outer surface, said plurality of lifters arranged in a plurality of rows extending along a longitudinal axis of said rotor;
   c. a first set of said plurality of rows of lifters defining a first region along said longitudinal axis;
   d. a second set of said plurality of rows of lifters defining a second region along said longitudinal axis; and
   e. said first region having a higher density of lifters affixed to said outer surface as compared to said second region.

2. The rotor of claim 1 further comprising said first region associated with an end of said rotor which contacts a slurry of pellets prior to said second region when said rotor is disposed for rotation within a pellet dryer.

3. The rotor of claim 2 wherein said second plurality of lifters in said second region further comprise a minimum number of lifters necessary to maintain an upward movement of pellets toward a discharge port in said pellet dryer.

4. The rotor of claim 1 further comprising said first and second pluralities of lifters being configured in a plurality of spaced apart rows of lifters in said first and second regions, and each of said spaced apart rows in said first region provided with a greater number of lifters than provided in said spaced apart rows in said second region.

5. The rotor of claim 1 further comprising at least one of said first and second pluralities of lifters further comprises a blade attachable to said outer surface, and said blade having a front surface configured to deflect said pellets generally inwardly toward said outer surface of said rotor, said front surface facing a direction in which the rotor is rotated.

6. The rotor of claim 5 further comprising said front surface of said blade having upper and lower edges, and said upper and lower edges defining an involute curve.

7. The rotor of claim 6 further comprising said upper and lower edges have a curvature defined by the following equations:

Xcoord=Inner Radius (COS Degree+Radian×SIN Degree); and

Ycoord=Inner Radius (SIN Degree+Radian×COS Degree).

8. A rotor for a centrifugal pellet dryer comprising:
a. an outer surface;
b. a plurality of lifters affixed to an outer surface or said rotor for directing said pellets upwardly; and
c. at least one of said plurality of lifters having a front surface configured to deflect said pellets generally inwardly toward said outer surface of said rotor said front surface facing a direction in which said rotor is rotated.

9. The rotor of claim 8 further comprising said front surface having upper and lower edges, and said upper and lower edges defining an involute curve.

10. The rotor of claim 9 further comprising said upper and lower edges have a curvature defined by the following equations:

Xcoord=Inner Radius (COS Degree+Radian×SIN Degree); and

Ycoord=Inner Radius (SIN Degree+Radian×COS Degree).

* * * * *